United States Patent [19]

Koyama et al.

[11] 4,142,789

[45] Mar. 6, 1979

[54] CHARGING MECHANISM OF A CAMERA SHUTTER

[75] Inventors: Mitsuo Koyama; Tadashi Nakagawa; Masanori Watanabe; Ichiro Nemoto; Eiichi Onda, all of Yotsukaido, Japan

[73] Assignee: Seiko Koki Kabushiki Kaisha, Japan

[21] Appl. No.: 751,333

[22] Filed: Dec. 16, 1976

[30] Foreign Application Priority Data

Dec. 19, 1975 [JP] Japan .................. 50-171642[U]

[51] Int. Cl.² ............................ G03B 9/06; G03B 9/36
[52] U.S. Cl. ...................................... 354/249; 354/226; 354/251; 354/266
[58] Field of Search ............... 354/226, 266, 246, 245, 354/247, 248, 249, 252, 251

[56] References Cited

U.S. PATENT DOCUMENTS

| | | | |
|---|---|---|---|
| 3,691,923 | 9/1972 | Kitai | 354/266 X |
| 3,838,436 | 9/1974 | Ogihara et al. | 354/266 X |
| 4,047,211 | 9/1977 | Inoue et al. | 354/266 X |

Primary Examiner—Michael L. Gellner
Attorney, Agent, or Firm—Robert E. Burns; Emmanuel J. Lobato; Bruce L. Adams

[57] ABSTRACT

A camera shutter mechanism including an actuating lever for actuating the mechanism, a biasing spring biasing the actuating lever to operate, and a hook lever for releasably holding the actuating lever against the action of the biasing spring. The actuating lever includes a pin extending outwardly therefrom, and a resilient cylindrical bushing loosely fitting around the pin, with the pin positioned so that the spring bears against the bushing to push the bushing against the pin. The pin is positioned so that structure for returning the actuating lever from a rest position to a cocked position pushes against the bushing when returning the actuating lever.

5 Claims, 3 Drawing Figures

CHARGING MECHANISM OF A CAMERA SHUTTER

BACKGROUND OF THE INVENTION

This invention relates to a charging mechanism of a camera shutter. Generally, charging a camera shutter for carrying out the exposure operation is carried out simultaniously with film advance by the operation of the film rolling-up mechanism of the camera. Because of manufacturing tolerances it is essentialy impossible to make the time point of finishing the charging the same for each charging operation. In order to solve this problem, the following method is generally attempted; namely, by providing a region to enable both mechanisms to actuate even after finishing the charging, so as to make both mechanisms perfectly charge by stopping both mechanisms in said region at the time point when one frame of the film has been advanced. However, to cope with the miniaturization of modern cameras, a miniaturization at the portion not directly relating the shutter performance becomes imperative, so that it is required to reduce said region in said charging mechanism.

SUMMARY OF THE INVENTION

The first object of this invention is to improve said charging mechanism applied to a small-sized shutter.

The second object of this invention is to provide a charging mechanism of simple construction.

The third object of this invention is to provide structure to make the actuating member for the exposure shutter reduce the degree of actuation thereof in the region of charging completion outside its actuating region.

According to this invention, a charging mechanism for a camera shutter provided with an actuating lever movable between a charge position and the stop position for the operation of a shutter, and a spring that energizes or biases said actuating lever from the charge position to the stop position. The spring has a pair of arms, one arm being supported by a fixed pin and the other arm being supported by said actuating lever. A releasable locking lever locks said actuating lever at the charge position against moving in response to said spring, and a charge lever shifts said actuating lever from the stop position to the charge position, wherein the spring arm supported by said actuating lever is made to engage with said charge lever through a movable member provided on and projecting from said actuating lever, and shifts said actuating lever from the stop position to the charge position.

The movable portion provided on and projecting from said actuating lever is rotatable and pipe shaped.

The actuating lever can correspond to a shutter closing member operable for finishing the exposure operation, and said charge lever can correspond to the opening member for starting the exposure operation. It also is possible to construct the present invention so that said actuating lever corresponds to the closing member operable for finishing the exposure operation, and said charge lever corresponds to a charge lever charging the shutter.

DESCRIPTION OF THE PREFERRED EMBODIMENT

Figure 1:
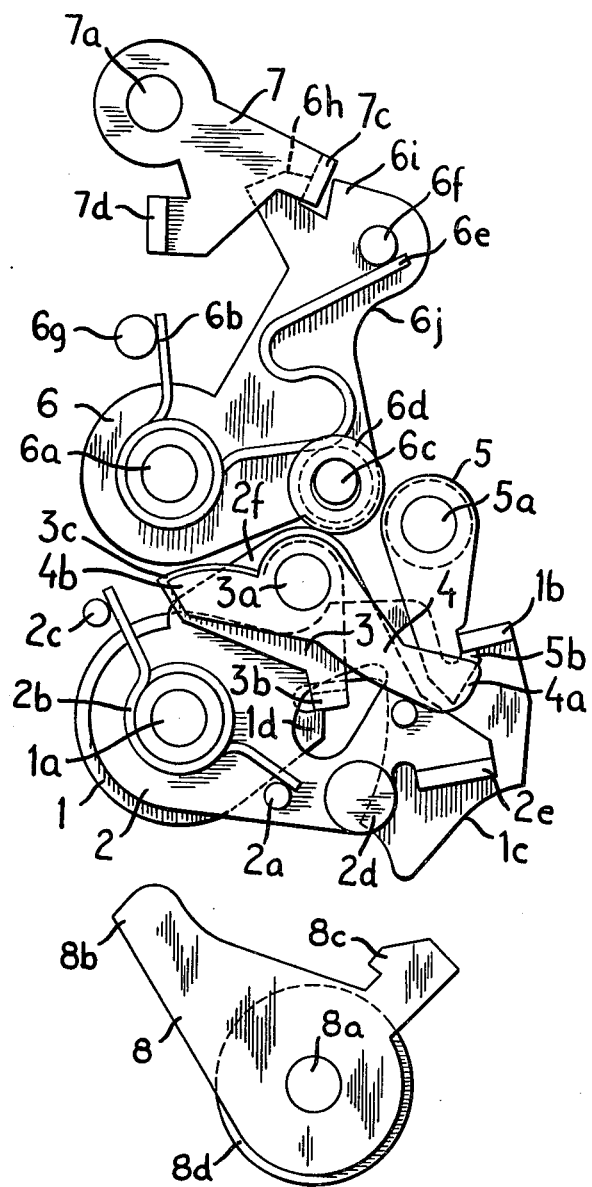
FIG. 1 is a plan view of the shutter charging mechanism according to the present invention shown in a cocked condition.

In FIG. 1, on a base plate, provided with a shutter opening (not shown in the figure) for exposure of film is supported each member shown in the figure. An opening member 1 is rotatably supported by a shaft 1a, and provided with a curved portion 1b at its right end, an arch portion 1c, and a hook portion 1d at its center. A driving member 2 having a fixed pin 2a is energized with a clockwise turning force developed by a spring 2b acting thereon and turned around the shaft 1a. And the other end of the spring 2b is fixed by a fixing pin 2c. In the right portion on the driving member 2 are formed a cocking portion 2d and a curved portion 2e, and on the outer circumferential portion is formed a cam 2f. And on the driving member 2, a connecting hook 3 is rotatably supported by a shaft 3a, and a downward curved portion 3b that penetrates a part of the driving member 2 engages with the hook portion 1d of the opening member 1, and a clockwise turning spring (not shown in the figure) is energized. The connecting hook 3 is shaped in the form having a projection 3c of the left end.

A connecting member 4 is mounted for rotation on the shaft 3a, and formed in such a way that the right end portion 4a is engagable with the curved portion 1b and the left end portion 4b is somewhat set back from the projection 3c.

An opening hook or lever 5 is rotatably supported by a shaft 5b and a hook portion 5b engages with the curved portion 1b of the opening member 1, and a counterclockwise turning spring (not shown in the figure) is energized. As the spring 2b of the driving member 2 acts on the hook portion 1d through the connecting hook 3, the curved portion 1b is locked by the opening hook 5 against responding to the action of the spring 2b. The opening hook or lever 5 together with hook portion 5b and curved portion 1b comprise means for releasably holding the opening member 1.

A closing member 6 is an actuating lever rotatably supported by a shaft 6a, and energized with a clockwise turning force by a spring 6b. In the closing member or actuating lever 6, a pin 6c is projected, and a pipe or cylindrical bushing 6d fits on the pin 6c with a gap. On the outer periphery of the pipe or bushing 6d spring 6b operates, and the free end 6e thereof is bent to engage with another pin 6f. The other end or first fixed portion of the spring 6b is fixed to a fixing pin 6g. A second portion of the spring 6b engaging the closing member of actuating lever 6 extends from the shaft 6a to the pin 6f. The free or second end portion 6e bears against the pin 6f, while the central portion of the spring bearing against the cylindrical bushing 6d is under compression. And the pipe or bushing 6d projects into the actuating region of the cam 2f of the driving member 2. At the upper left end of the closing member 6 are formed a hook portion 6h, a stop portion 6i, and a concave portion 6j. A closing hook or lever 7 is rotatably supported by a shaft 7a, and a clockwise turning spring (not shown in the figure) is energized. And a downward curved portion 7c locks the hook portion 6h, and a upward curved portion 7d is provided. The closing hook or lever 7 together with the curved portion 7c and the hook portion 6h comprise means for releasably holding the closing member 6.

A cocking lever 8 is rotatably supported by a shaft 8a, and a cam portion 8b and a hook portion 8c are formed, energizing a counterclockwise turning spring not shown in the figure. Also, an elastic pipe or bushing 8d formed as one body is fixed below. Next, the method of operation is described.

When the opening hook 5 is turned clockwise from the state in FIG. 1 against the spring to effect shutter release, the hook portion 5b releases the curved portion 1b. When the curved portion 1b is released, the opening member 1, being operatively connected as one body with the driving member 2 through the connecting hook 3, opens an opening (not shown in the figure) by turning clockwise by the spring 2b and starts an exposure. At the termination of the actuation period of the driving member 2, the curved portion 2e engages with the locking portion 8c of the cocking lever 8, making the locking lever 8 turn clockwise against the spring, and the arch portion 1c engages with the elastic pipe 8d deforming the pipe 8d by compression. The cocking lever 8 that is fixed to the elastic bushing 8d to define a single body therewith is made to turn counterclockwise to lock the curved portion 2c by the concave portion of the locking portion 8c. When the arch portion 1c engages with the elastic pipe 8d, the cocking portion 2d simultaneously pushes the cam portion 8b to make the cocking lever 8 turn counterclockwise. Therefore, the opening member 1 is decelerated by the engagement with the locking portion 8c, the elastic pipe 8d, and the cam portion 8b, and at the same time is locked by the concave portion of the locking portion 8c, so that rebounding at the stop or rest position after traveling at high speed is prevented.

Figure 2:
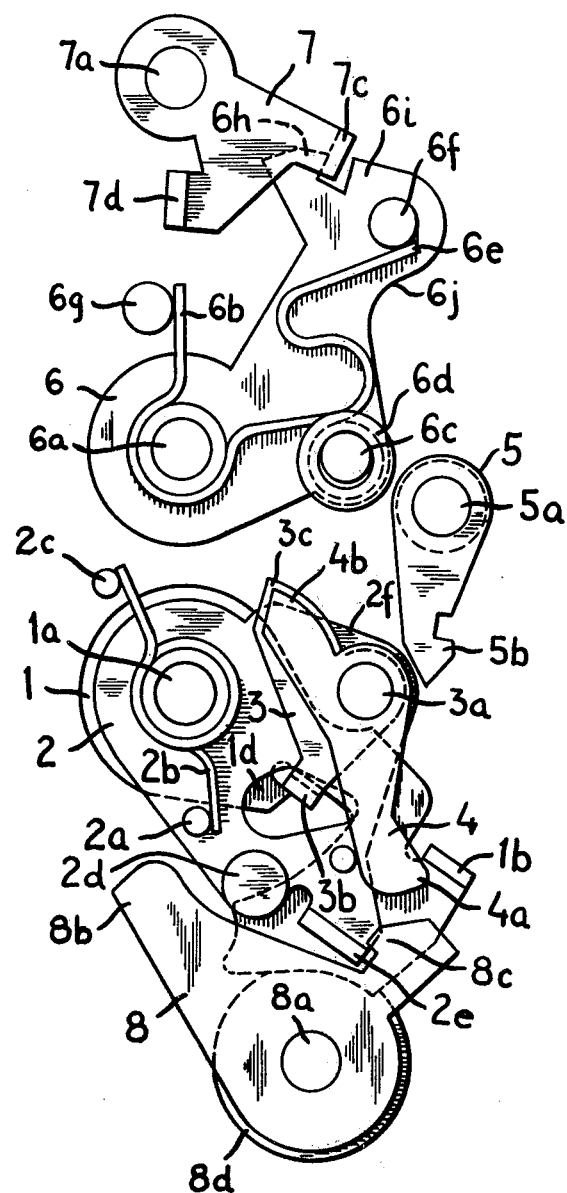
FIG. 2 illustrates the charging mechanism shown in FIG. 1 in a condition corresponding to an open shutter.

Although not shown in the figure, there is provided another stopping device for regulating the actuation terminating portion of the opening member 1 operation. FIG. 2 shows the actuation terminating state of the driving member 2.

In a known manner, when the required exposure time has elapsed, the curved portion 7d of the closing hook 7 is made to turn counterclockwise against a spring and the downward curved portion 7c of the closing hook 7 releases the hook portion 6h from the locked condition.

When the hook portion 6h is released, the closing member 6 turns clockwise by the spring 6b to close an opening (not shown in the figure), thus terminating the exposure. In the actuation terminating region of the closing member, the pipe 6d engages with the projection 3c of the connecting hook 3 and makes the connecting hook 3 turn counterclockwise around the shaft 3a to release the engagement between the curved portion 3b and the hook portion 1d, and thereby release the connection between the opening member 1 and the driving member 2. When the closing member 6 turns further, the pipe 6d engages with the left end portion 4b of the connecting member 4 to make the connecting member 4 turn counterclockwise around the shaft 3a and push the curved portion 1b with the right end portion 4a to make the opening member 1 turn counterclockwise, thereby displacing the opening member 1 in the closing direction again. When the pipe 6d returns for closing the opening member 1 again through the connecting member 4, because the opening has already been closed, the exposure operation is not affected, and the concave portion 6j abuts against the outer periphery of the shaft 5a, resulting in finishing of the actuation of the closing member 6.

By the aforementioned actuation, the shutter operation is finished. Then, in order to charge the shutter again, the cocking lever 8 is turned clockwise around the shaft 8a against a spring, and after releasing the curved portion 2e engaged by the locking portion 8c, the cam portion 8b pushes against the projection 2d to make the driving member 2 turn counterclockwise against the spring 2b, and at the same time, the cam portion 2f engages with pipe 6d, making the pipe 6d turn counterclockwise around the shaft 6a.

The pipe 6d pushes the spring 6b and the free end 6e pushes the pin 6f to make the closing member 6 turn counterclockwise around the shaft 6a.

When the cocking lever 8 is turned clockwise further, according to the relation mentioned above, the driving member 2 and the closing member 6 are turned counterclockwise, and during the counterclockwise turning of the driving member 2 the curved portion 3b of the connecting hook 3 accompanies the hook portion 1d of the opening member 1. At the actuation terminating region of the cocking lever 8, the curved portion 3b is locked with the hook portion 1d, and the curved portion 1b of the opening member is locked with the hook portion 5b of the opening hook 5. Then, after the hook portion 6h is locked with the curved portion 7c, the cocking lever 8 returns to the rest position shown in FIG. 1.

Figure 3:
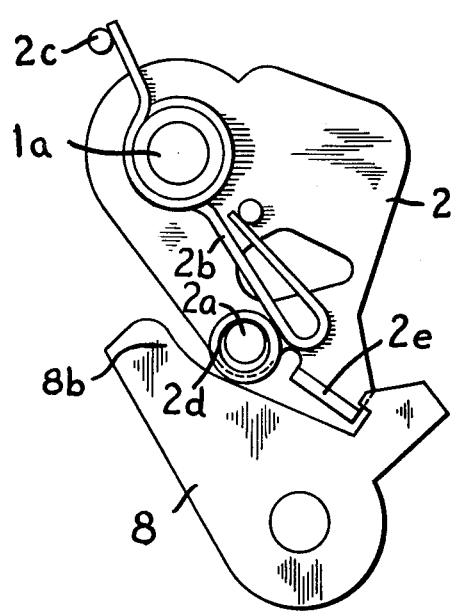
FIG. 3 illustrates another embodiment of the present invention.

FIG. 3 shows another embodiment, wherein the spring 2b of the driving member 2 is shaped so as to act on the pipe 2d that is mounted on the pin 2a with a gap therebetween, and by pushing the pipe 2d with the cam portion 8b of the cocking lever 8, the driving member 2 is charged.

In case the two embodiments described above are applied to the opening and closing device of a focal plane shutter used in a camera, constituted so as to actuate the front screen by the opening member and the rear screen by the closing member, the stroke of a rolling-up mechanism is increased and the cocking lever is turned. Even in such a case, since it is possible to decrease the stroke more than the usual stroke merely by rolling-up the front and rear screen at a specified stroke, the housing space of these screens can be reduced so that in a so-called metallic focal plane shutter of the type that the blades are made of thin-metallic plates, the problem of size will be improved by allowing miniaturization.

When the driving member 2 and the closing member 6 are charged by turning the cocking lever 8 by a usual stroke of a camera, the closing member 6 stops at the position where the stop portion 6i abuts against the curved portion 7c resulting in stopping the rear screen and if the cocking lever 8 and the driving member 2 are further rotated the pipe 6d compresses the arm 6e of the spring 6b impeding the rolling-up of the closing member 6 by the driving member 2.

Also in the 2nd embodiment, since the opening member 1 is stopped at the specified stroke, the pipe 3d compresses the spring 2b to impede the rolling-up stroke of the front screen, thereby reducing the housing space of the front screen.

As is evident from the above description, according to the 1st embodiment, the housing space of the rear screen is small, and according to the 2nd embodiment it is possible to reduce the housing space of the front screen thereby realising the miniaturization of a camera in either case.

Incidentally, it should be noted that, not only in the focal plane shutter but also in the usual mechanism, the shutter will be miniaturized thus requiring less space for actuation and facilitating bringing member into perfect coordination with the camera operation by applying the device of this invention to the relating parts of the charge lever and the actuating lever.

We claim:

1. In a camera shutter mechanism:
    an actuating lever mounted to pivot between a cocked position and rest position for actuating the camera shutter mechanism;
    a spring having a first fixed portion and a second portion engaging said actuating lever for biasing said actuating lever from the cocked position to the rest position;
    means for releasably holding said actuating lever in the cocked position and for releasing said actuating lever to pivot from the cocked position to the rest position; and
    means for returning said actuating lever from the rest position to the cocked position; wherein said actuating lever includes a pin extending outwardly therefrom, and a resilient cylindrical bushing loosely fitting around said pin, with said pin positioned so that said spring bears against said bushing to push said bushing against said pin, and said pin positioned so that said means for returning pushes against said bushing when returning said actuating lever from the rest position to the cocked position.

2. In a camera shutter mechanism according to claim 1: wherein said actuating lever is a closing member of the camera shutter mechanism effective to terminate exposure upon pivoting from the cocked position to the rest position; the camera shutter mechanism further including an opening member having a cocked position and a rest position and effective to initiate exposure when displaced from the cocked position to the rest position, and a driving member operable for driving said opening member from the cocked position to the rest position, said means for returning comprising said driving member positioned for engaging said bushing mounted on said actuating lever to pivot said actuating lever from the rest position to the cocked position as said driving member is displaced from the rest position to the cocked position.

3. In a camera shutter mechanism according to claim 1: wherein said actuating lever is an opening member of the camera shutter mechanism effective to initiate exposure upon pivoting from the cocked position to the rest position; and said means for returning is comprised of a lever mounted to pivot and positioned to pivot and engage said actuating lever when the same is in the rest position and return said actuating lever to the cocked position.

4. In a camera shutter mechanism according to claim 1: wherein said means for releasably holding includes a lever mounted to pivot for positioning an end thereof adjacent and away from said actuating lever, and means for engaging said actuating lever at said end of said lever when said end is adjacent said actuating lever and for disengaging said actuating lever when said end is displaced away from said actuating lever.

5. In a camera shutter mechanism according to claim 1: a fixed pin; and a pin mounted on said actuating lever; and wherein said spring includes a central portion under compression, an end portion comprising said first fixed portion bearing against said fixed pin, and a second end portion bearing against said pin mounted on said actuating lever and maintaining said central portion of said spring under compression so that said spring biases said actuating lever from the cocked position toward the rest position.

* * * * *